No. 633,407. Patented Sept. 19, 1899.
J. T. WINDSOR.
KILN.
(Application filed Mar. 17, 1899.)
(No Model.) 2 Sheets—Sheet 1.
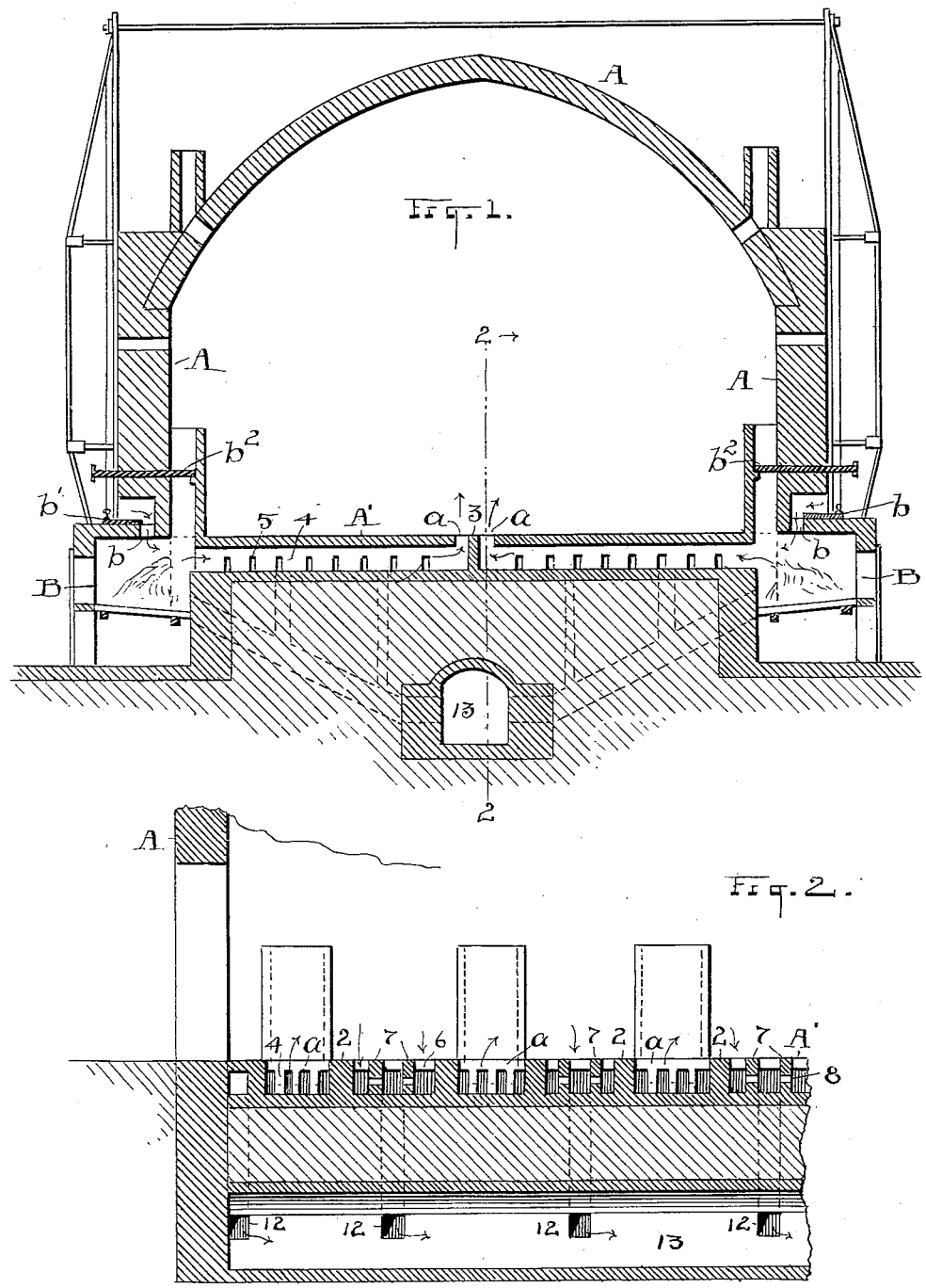
ATTEST
INVENTOR.
JOHN T WINDSOR
BY H. T. Fisher ATTY

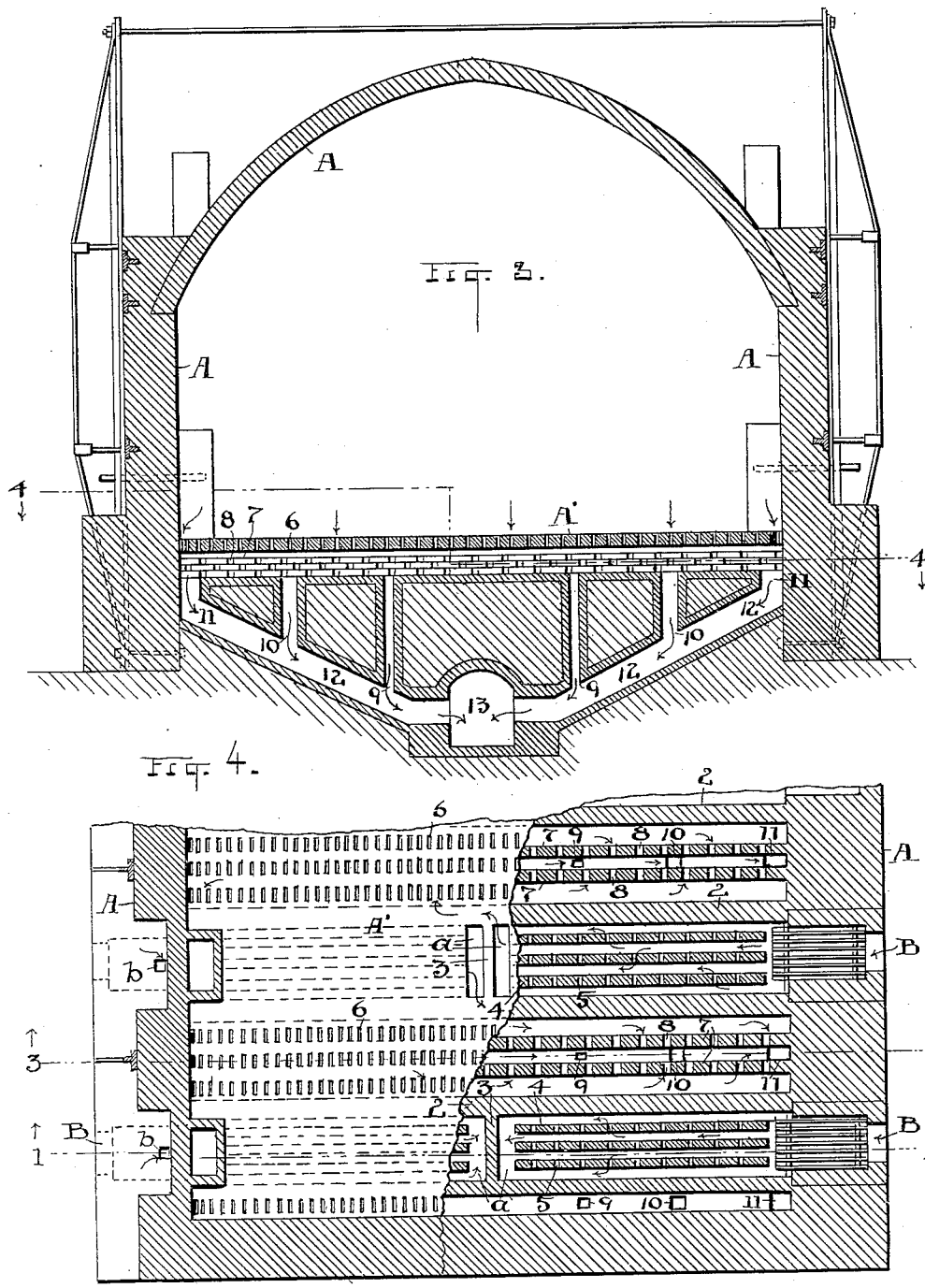

UNITED STATES PATENT OFFICE.

JOHN T. WINDSOR, OF AKRON, OHIO.

KILN.

SPECIFICATION forming part of Letters Patent No. 633,407, dated September 19, 1899.

Application filed March 17, 1899. Serial No. 709,410. (No model.)

*To all whom it may concern:*

Be it known that I, JOHN T. WINDSOR, a citizen of the United States, residing at Akron, in the county of Summit and State of Ohio, have invented certain new and useful Improvements in Kilns; and I do declare that the following is a full, clear, and exact description of the invention, which will enable others skilled in the art to which it appertains to make and use the same.

My invention relates to kilns for burning bricks, tiles, and earthenware of various kinds; and the invention consists of a kiln having combined up and down drafts and constructed and operating substantially as shown and described, and particularly pointed out in the claims.

In the accompanying drawings, Figure 1 is a cross-section of my improved kiln on a line corresponding to 1 1, Fig. 4, this being an updraft-section. Fig. 2 is a vertical sectional elevation of the lower portion of the kiln on line 2 2, Fig. 1, disclosing the up and down drafts as they appear alternately on this line, and a further interpretation of which will be found in Fig. 4, which is a plan view of part of the bottom. Fig. 3 is a vertical cross-section of the kiln on line 3 3, Fig. 4, and is a downdraft-section. Fig. 4 is a plan view, partly in section, of a portion of the bottom of the kiln corresponding to line 4 4, Fig. 3.

A represents the outer wall or body of the kiln, including the side walls and dome, and while a rectangular form of kiln is here shown the form or shape really is not material, and one that is circular or oval may be used, if preferred. The matter of proportions of course appertains simply to the art of building and need not be considered here.

A' is the bottom or floor of the kiln, in which much of the present invention resides, and hence its peculiarities should be carefully examined and understood.

As has already been suggested, my invention belongs to the type of kilns in which both updraft and downdraft are utilized, thus getting the highest possible per cent. of heat-units or efficiency out of the whole volume of heat and also diffusing the heat in such manner that it will do the most perfect work possible in kilns of this kind. Of course uniformity in the distribution of the heat throughout the kiln is a prime desideratum, because only in this way do I obtain uniform results upon the ware or stock exposed, and thus also do I avoid a destructive effect by excess of heat at one point and total lack and inefficiency at another point. Now, having these effects in view, I have a floor A', provided with alternating up and down draft-flues separated by walls 2, running entirely across the kiln from side to side, and at the ends of the up or inlet flues on each side are suitable furnaces B. These furnaces are so arranged as to discharge at the rear and top into the ends of the up-flues, and each furnace has a relatively small air-inlet $b$ to the top thereof, controlled by any suitable means, an ordinary slide-valve $b'$ being shown in this instance. The inlet or updraft flues are described as extending entirely across the kiln, and so they do; but yet each flue having a furnace at each end is practically divided or broken in two at the middle by a cross-wall 3, standing centrally in the open outlet or discharge $a$ into the kiln. This has been found important to protect each flue-section from the effect of the opposite furnace. It may occur that there is considerably more energy or heat flowing out of one furnace than the other by reason of the wind or other cause, and the one having the heavier draft is liable to choke the weaker one unless protected by the walls 3. With this wall each furnace has an unobstructed outlet into the kiln, and the heat agents or products of combustion of both flow out together at the middle of the kiln, and thence up to the dome, where it is deflected and passes back through the products to the outlet-flues.

A further distinguishing novelty of the up or inlet flues is their series of two or more parallel dividing-walls 4, running in each half of the flue from the inlet at the furnace to near the cross-wall 3, Fig. 4, and separated to form draft-channels between them in combination with the perforated walls of the downdraft-flues, as hereinafter described. These walls are also provided with numerous transverse holes or openings 5, by means of which the heat is evenly distributed primarily in the flue itself and the floor A, supported by said walls, above is uniformly heated for radiation into the kiln. Of course I can use the updraft principle alone and discharge the heat without passing into the downdraft at all; but this is not generally preferable, or by withdrawing dampers $b^2$ I can let the heat flow directly into the kiln without going through the updraft-flues, or I can take more or less heat in here and let a part go through the flues.

Now referring to the downdraft or outlet flues, they will be seen as lying between the updraft-flues and having a series of relatively small openings 6 in rows extending the entire length of said flues from side to side of the kiln, and beneath the floor A' with these openings the said flues have parallel walls 7, with a series of perforations 8 through the walls for the passage of the escaping heat into the outlet-passages 9, 10, and 11, Fig. 3. These passages are graduated in cross-section, increasing in size toward the wall of the kiln, where it is most difficult to keep the heat at an even temperature with the middle of the kiln. From these downdrafts 9, 10, and 11 the heat discharges into the common exit-ducts 12, and thence out at 13 to the smoke-stack.

By the foregoing construction a kiln is produced which will burn any clay product without using the material itself as a medium to form flues, as some combined up and down draft kilns have to do; but the kiln has its own complete flues serving every purpose. Then, again, I obtain and hold absolute control of all the heat at all times, whether using the updraft or the downdraft principle alone or together.

It will be noticed as a distinguishing and novel feature of this invention that both the heat passages or ducts leading from the furnace to the kiln have their opening or outlet in the angle of the furnace at the top or rear and that the air-inlet $b$ in the top thereof owing to its location permits a sufficient quantity of cold air to be drawn in along the top of the furnace and into the horizontal updraft-flue. The inrush of air is regulated by damper $b'$ and is intended to act as a barrier to prevent the heat from rising up through the vertical passage into the kiln, even if the damper $b^2$ therein is withdrawn. By the proper regulation of the two dampers $b'$ and $b^2$ a division of the heat through the direct vertical passage and the horizontal updraft-flue can be obtained. The operation of the kiln is as follows: The furnaces being fired, the heat generated enters the horizontal updraft-flues, wherein it passes through the numerous transverse openings in the dividing-walls 4, and by means of which is uniformly distributed in the flue itself to heat the floor of the kiln above before passing out at the opening $a$, located in the middle of the kiln. The heat now passes up and about the ware and then comes down and goes through the small openings 6 in the floor scattered over the entire length of the downdraft-flues. These flues have passages divided by perforated walls, and the heat in the passages diffuses through said perforations to the central passage, where it escapes through the graduated outlet-passages 8 9 10 into the exit-duct 12 and thence out at the common passage 13 to the smoke-stack. Under certain conditions and when burning certain kinds of ware it is desirable to regulate the temperature and also the amount of heat. To that end the air-inlet $b$ and its damper $b'$ are used, sometimes with and other times without the damper $b^2$ in the vertical side passage or direct flue. When the kiln is cold, damper $b^2$ is closed, which allows all the heat to go through the updraft-flue. When the kiln becomes too hot, dampers $b'$ and $b^2$ are opened to allow a certain amount of cold air from opening $b$ in the roof of the furnace to pass up the vertical discharge for the purpose of keeping the ware or brick opposite the vertical flue at the top and sides of kiln from becoming too hot and promoting a more equal burning of the same. This flow of the cold air from opening $b$ to the vertical flue acts as a barrier or check upon the heat from the furnace at the mouth of the said flue and practically causes the entire heat of the furnace to enter the horizontal or updraft flue.

What I claim is—

1. In kilns substantially as described, an updraft-flue with an inlet at one end and an outlet at the other end, and a series of walls running lengthwise of the flue apart from the side walls thereof and apart from each other and perforated for the even distribution of heat, in combination with a downdraft-flue horizontally in the bottom of the kiln having inlet-openings scattered over its top and parallel perforated walls between its sides and ends, and graduated outlets at its bottom, substantially as described.

2. In kilns, a downdraft-flue horizontally in the bottom of the kiln having inlet openings scattered over its top and parallel perforated walls between its sides and ends, and graduated outlets at its bottom having the largest outlets at the walls of the kiln, substantially as described.

3. A kiln having a furnace at each side and an updraft-flue between said furnaces with an opening into the kiln substantially midway its length and a division-wall across said flue midway said opening, a series of perforated walls running lengthwise of said flue and forming passages therein for the equal distribution of heat, in combination with a downdraft-flue having inlet-openings scattered over its top and parallel perforated walls between its sides and ends, and graduated outlets at its bottom having the largest outlets at the side walls of said kiln, substantially as described.

4. The up and down draft kiln and furnace combined, said parts constructed with both a horizontal and a vertical discharge from the furnace into the kiln out of the same angle in the top and end of the furnace, a cold-air inlet in the roof of the furnace near said angle and substantially on a level with the mouth of the vertical discharge and the top of the mouth of the horizontal discharge, and means to regulate the flow of air through said air-inlet, substantially as described.

5. The up and down draft kiln and furnace combined, said parts constructed with both a vertical and horizontal discharge into the kiln out of the same angle in the top and end of the furnace, a cold-air inlet in the roof of the furnace near said angle and substantially on a level with the mouth of the vertical discharge and the mouth of the horizontal discharge, and dampers for said vertical discharge and inlet-opening, substantially as described.

Witness my hand to the foregoing specification this 6th day of March, 1899.

JOHN T. WINDSOR.

Witnesses:
H. T. FISHER,
R. B. MOSER.